G. S. KING.
FRONT AXLE RADIUS ROD.
APPLICATION FILED JAN. 12, 1920.
1,392,175.
Patented Sept. 27, 1921.
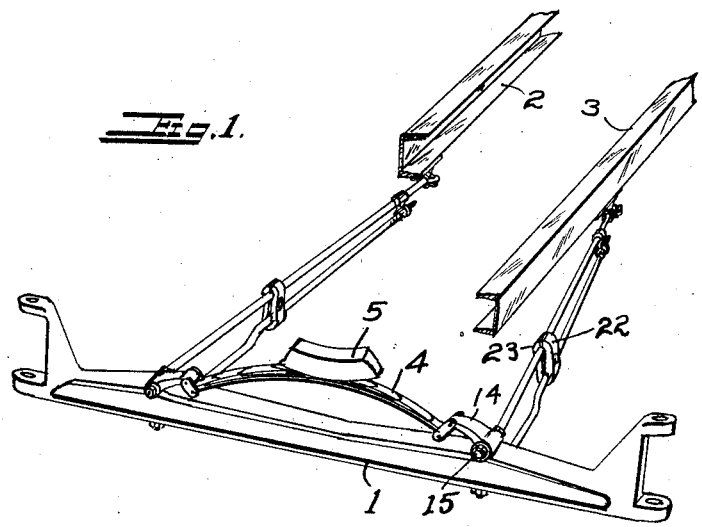
Fig. 1.
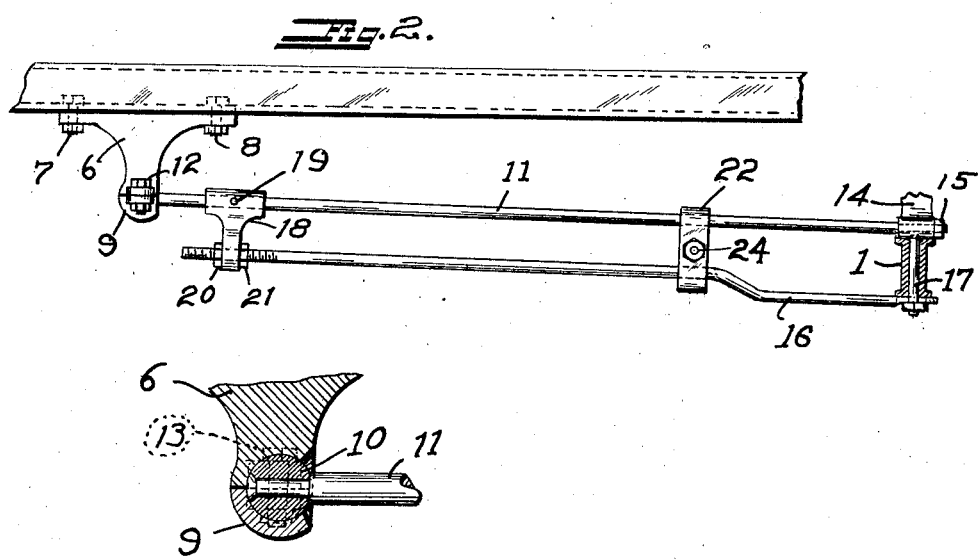
Fig. 2.
Fig. 3.
INVENTOR.
George. S. King.
BY Carlos P. Griffin
ATTORNEY.

UNITED STATES PATENT OFFICE.

GEORGE S. KING, OF SOUTH BERKELEY, CALIFORNIA.

FRONT-AXLE RADIUS-ROD.

1,392,175.  Specification of Letters Patent.  Patented Sept. 27, 1921.

Application filed January 12, 1920. Serial No. 350,911.

*To all whom it may concern:*

Be it known that I, GEORGE S. KING, citizen of the United States, residing at South Berkeley, in the county of Alameda, State of California, have invented a new and useful Front-Axle Radius-Rod, of which the following is a specification in such full and clear terms as will enable those skilled in the art to construct and use the same.

This invention relates to a radius rod for front axles of automobiles, and its object is to provide means whereby the front axle will be held in the proper relation to the frame of the automobile where springs are used which do not properly secure the axle themselves in such position.

Another object of the invention is to provide a radius rod which will be stiff enough to hold the axle in the proper position and which at the same time will be capable of pivoting in two planes to provide lateral movements of the axle with respect to the frame of the vehicle.

It will be understood by those skilled in that art that in driving an automobile, the axle is subjected to violent movements in all directions, and such movements must be prevented from damaging the vehicle by suitable stiffening rods; but these rods must themselves be capable of responding to those movements without bending, or in a short time they will break.

In the present instance, a ball and socket connection is used on the frame of the vehicle, thereby making it possible to permit an up and down and sidewise movement of the radius rod without injury thereto.

Other objects of the invention will appear as the description proceeds.

An embodiment of the invention is shown in the accompanying drawing in which the same reference numeral is applied to the same portion throughout, but I am aware that there may be modifications thereof.

Figure 1 is a perspective view of the front axle of a vehicle showing portions of the two side frame members showing radius rods applied thereto.

Fig. 2 is a side elevation of a portion of one of the frame members and one of the radius rods, and Fig. 3 is a sectional view through the bracket for holding the ball on the end of the radius rod.

The numeral 1 indicates the front axle of the vehicle, 2 and 3 the side rails.

The front spring is indicated at 4 and it is provided with a yoke 5 which forms the support of the front end of the frame of the vehicle.

Each rail has a depending bracket 6 which is connected thereto by means of bolts 7 and 8 and said bracket has a cap 9 for inclosing the ball 10 on the end of the radius rod 11.

The cap is secured to the bracket by means of two bolts 12, 13.

The radius rod 11 extends through the perch 14 on the front axle. It is connected thereto by means of a nut 15. Below the radius rod 11, there is an auxiliary stiffening rod 16 which has at its front end flattened to form an eye to receive the bolt 17 from the perch 14.

The rod 11 carries a depending bracket 18 which is connected thereto by means of a taper pin 19, and the rod 16 extends therethrough and is secured thereto by means of two nuts 20, 21. Said nuts are used for the purpose of adjusting the vertical position of the axle 1.

In order to stiffen the two rods 11 and 16 as a unit, they are connected together by means of two lugs 22, 23; said lugs being secured against the rods by means of a bolt 24.

What I claim is as follows, but various modifications may be made in the construction shown in the drawings and above particularly described form, within the purview of my invention.

1. A radius rod for the front axles of vehicles comprising a long rod having a ball at one end, a shorter rod having one end threaded, clamps for connecting the two rods at their middle portion, a depending bracket secured to the longer rod adjacent the ball and to which the threaded end of the shorter rod is adjustably connected and a depending bracket adapted to be connected to the frame of a vehicle to which the longer rod is connected by means of said ball, both of said rods being adapted to be connected at their other ends to the vehicle axle, 2. A radius rod for the front axle of vehicles comprising the combination with an axle of a pair of rods secured thereto, one of said rods being longer than the other and carrying a ball at one end, clamps connecting the two rods together near their middle portions, a depending bracket carried by the longer rod and to which the shorter rod is secured by means of lock nuts and a depending bracket adapted to be connected with the frame of a vehicle to provide a bearing for the ball on the longer rod.

In testimony whereof I have hereunto set my hand.

GEORGE S. KING.